(12) United States Patent
Ise

(10) Patent No.: US 9,282,245 B2
(45) Date of Patent: Mar. 8, 2016

(54) IMAGE CAPTURING APPARATUS AND METHOD OF CONTROLLING THE SAME

(71) Applicant: CANON KABUSHIKI KAISHA, Tokyo (JP)

(72) Inventor: Makoto Ise, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 14/246,921

(22) Filed: Apr. 7, 2014

(65) Prior Publication Data
US 2014/0308018 A1 Oct. 16, 2014

(30) Foreign Application Priority Data
Apr. 10, 2013 (JP) .................. 2013-082497

(51) Int. Cl.
H04N 5/232 (2006.01)
H04N 9/79 (2006.01)
H04N 5/77 (2006.01)

(52) U.S. Cl.
CPC ........... *H04N 5/23245* (2013.01); *H04N 5/772* (2013.01); *H04N 9/79* (2013.01)

(58) Field of Classification Search
None
See application file for complete search history.

(56) References Cited

U.S. PATENT DOCUMENTS

2009/0189995 A1* 7/2009 Shimazaki et al. ........ 348/222.1
2012/0212663 A1* 8/2012 Takita ........................ 348/364

FOREIGN PATENT DOCUMENTS

JP 09-233410 A 9/1997
JP 2006-310907 A 11/2006

* cited by examiner

*Primary Examiner* — Eileen Adams
(74) *Attorney, Agent, or Firm* — Cowan, Liebowitz & Latman, P.C.

(57) ABSTRACT

An image capturing apparatus which performs moving image recording and still image capturing comprises: an image sensing unit configured to output an image signal in accordance with a quantity of incident light; a developing unit configured to perform development processes for a moving image or a still image for image signals output from the image sensing unit; a storage unit configured to store image signals output from the image sensing unit; and a control unit configured to control to perform a development process for a moving image corresponding to one frame of the image signals output from the image sensing unit and a development process for part of one frame of the image signals stored in the storage unit within a one-frame period of the moving image capturing, in a case where the still image capturing is performed during moving image recording.

14 Claims, 13 Drawing Sheets

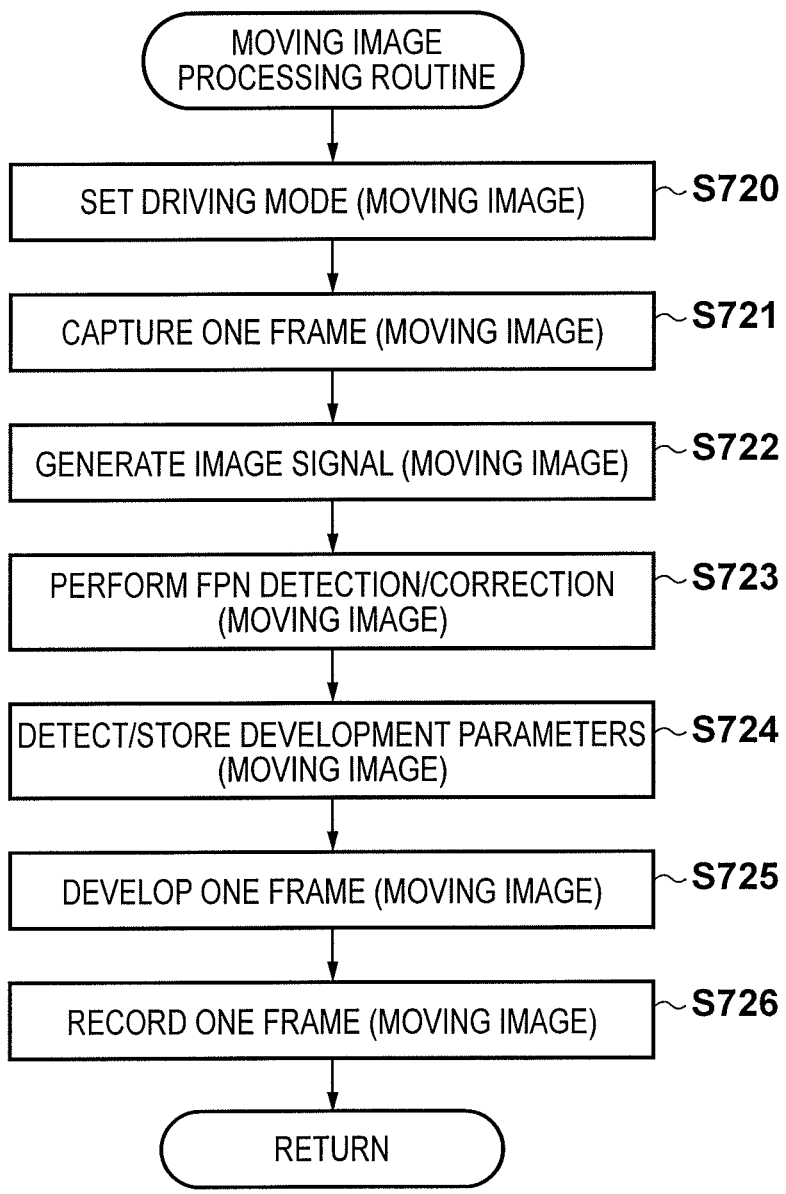

FIG. 8A
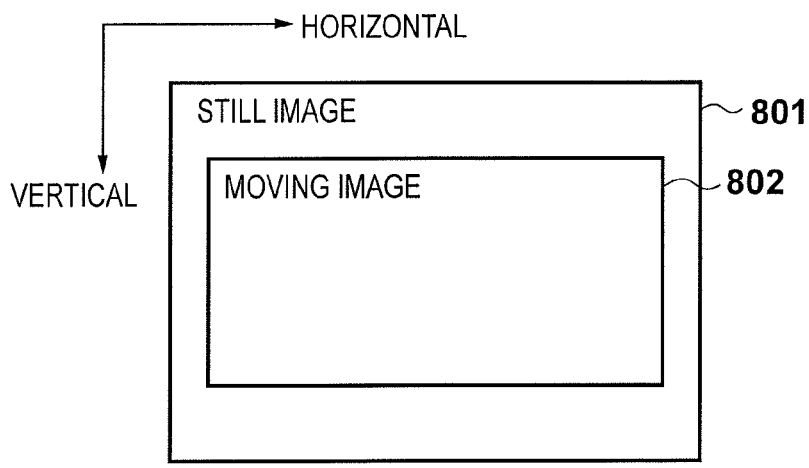
FIG. 8B
STILL IMAGE RAW DATA
| DIVIDED AREA 1 |
| DIVIDED AREA 2 |
| DIVIDED AREA 3 |
| ⋮ |
| DIVIDED AREA N |
FIG. 8C
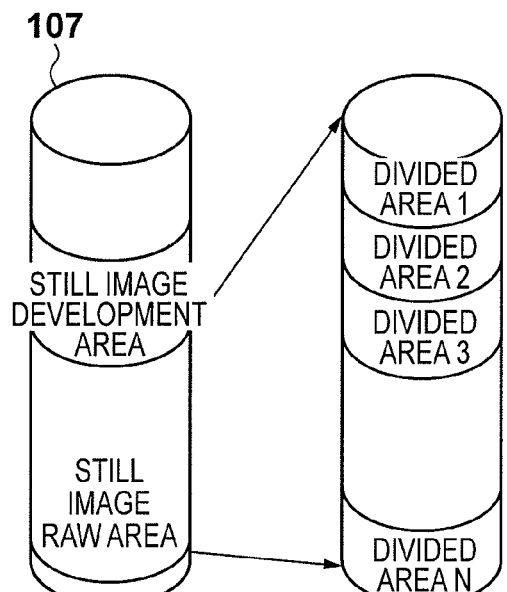
MEMORY ALLOCATION F I G. 10
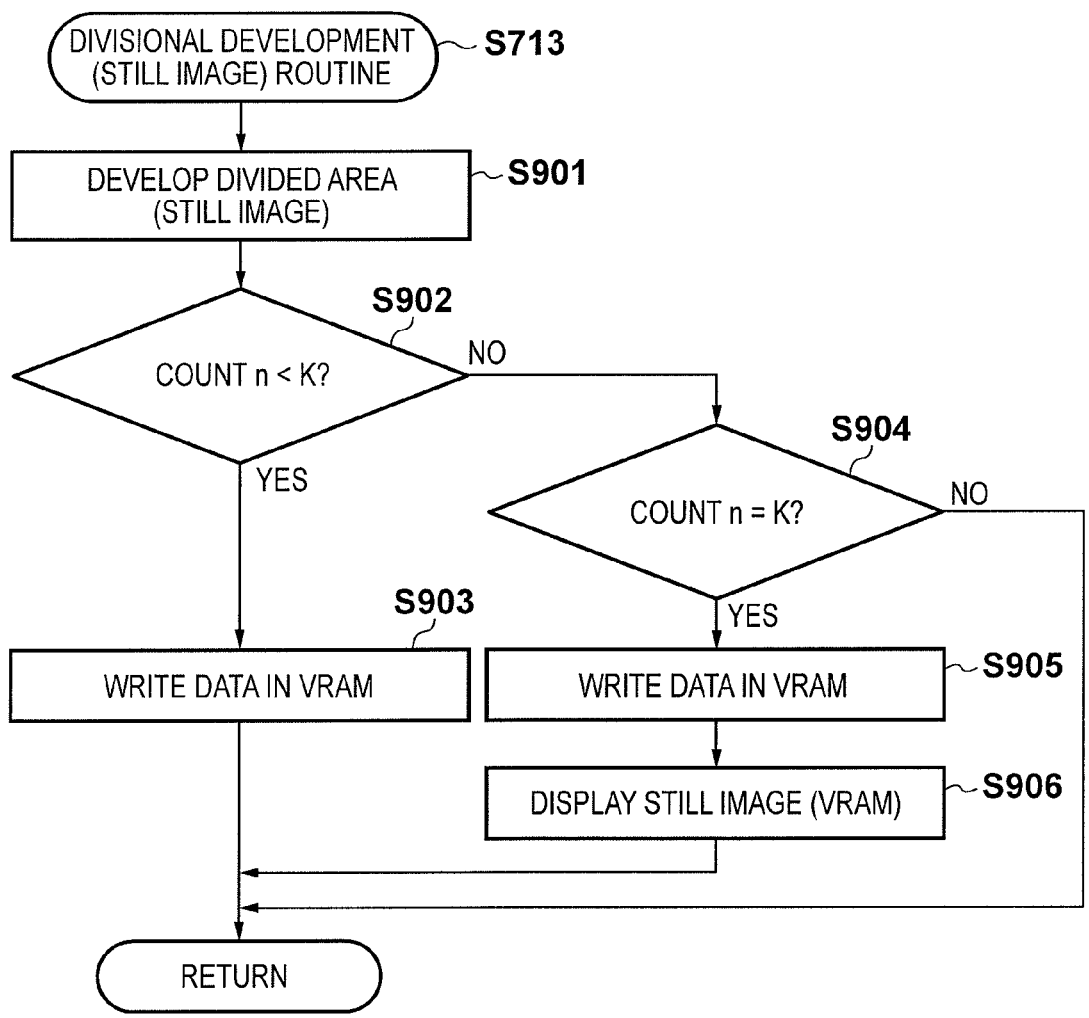

IMAGE CAPTURING APPARATUS AND METHOD OF CONTROLLING THE SAME

BACKGROUND OF THE INVENTION

1. Field of the Invention

The present invention relates to a technique of performing still image capturing without stopping moving image recording in an apparatus which performs still image capturing during moving image recording.

2. Description of the Related Art

Recently, a digital still camera or digital video camera aimed at still image capturing during moving image recording has been proposed. For example, Japanese Patent Laid-Open No. 9-233410 discloses a digital video camera which can write still image data in a recording medium upon completion of moving image recording by temporarily storing the data in a memory in advance, when a request to perform still image capturing is issued during the moving image recording.

The technique disclosed in Japanese Patent Laid-Open No. 9-233410, however, suffers from a problem that it is not possible to record a high resolution still image because the recording size of the still image is not associated with the size of images output from a solid-state image sensor and a one-frame image in moving image recording is recorded.

In contrast, Japanese Patent Laid-Open No. 2006-310907 has proposed a digital camera designed to temporarily stop moving image recording upon performing still image capturing and resume the moving image recording as a method of recording a still image with high resolution during moving image recording. This patent literature describes a technique of recording a moving image without skipping any missing frame by inserting a black image in each missing frame.

The technique disclosed in Japanese Patent Laid-Open No. 2006-310907 has, however, a problem that since there are missing frames, the user cannot see anything that has occurred during each missing frame at the time of moving image reproduction.

One of the reasons why it is not possible to capture a high resolution still image without stopping moving image capturing during moving image recording is that moving image processing occupies a development processing circuit, and the circuit cannot be used for a still image development process. However, respectively having development process circuits for moving images and still images will hinder the reduction of cost, size, and power consumption. That is, this is not a preferable solution.

Recently, an increase in the operation speed of an image sensor or dedicated signal processing IC has been enabling to read out a high resolution moving image with the number of pixels similar to that of a still image. This makes it possible to temporarily store high resolution still image RAW data in a memory in advance without stopping moving image capturing during moving image recording and write the data in a recording medium upon completion of moving image recording.

However, the memory occupation of high resolution still image RAW data is very large. On the other hand, since the capacity of a memory which can temporarily store data is limited, the number of frames of still images which can be recorded during moving image recording is considerably limited by the memory capacity.

FIG. 12 is a timing chart for schematically explaining the above operation. Referring to FIG. 12, when starting still image capturing during moving image recording, the image capturing apparatus sequentially stores still image RAW data in predetermined areas like the memory 1 area and the memory 2 area of the semiconductor memory in the apparatus for every operation. This will soon fill the capacity of the semiconductor memory. The still image RAW data stored in the semiconductor memory is developed and recorded after the completion of moving image capturing, the capacity of the semiconductor memory becomes full at the Nth frame in the case shown in FIG. 12. Thereafter, it is not possible to perform still image capturing until the end of moving image capturing.

SUMMARY OF THE INVENTION

The present invention has been made in consideration of the above situation, and enables an image capturing apparatus which performs still image capturing during moving image recording to perform high resolution still image capturing without stopping moving image recording and without any constraints from the number of frames to be captured.

According to the present invention, provided is an image capturing apparatus which is configured to perform moving image recording and still image capturing comprising: an image sensing unit configured to output an image signal in accordance with a quantity of incident light; a developing unit configured to perform development processes for a moving image or a still image for image signals output from the image sensing unit; a storage unit configured to store image signals output from the image sensing unit, and a control unit configured to control to perform a development process for a moving image corresponding to one frame of the image signals output from the image sensing unit and a development process for part of one frame of the image signals stored in the storage unit within a one-frame period of the moving image capturing, in a case where the still image capturing is performed during moving image recording.

According to the present invention, provided is a method of controlling an image capturing apparatus which is configured to perform moving image recording and still image capturing by using an image sensing unit configured to output an image signal in accordance with a quantity of incident light, the method comprising: a storage step of causing a storage unit to store image signals output from the image sensing unit; a first developing step of performing a development process for a moving image corresponding to one frame of the image signal output from the image sensing unit in a case where the still image capturing is performed during moving image recording; and a second developing step of performing a development process for part of one frame of the image signals stored in the storage unit; wherein the first developing step and the second developing step are controlled to be performed within a one-frame period of a moving image capturing.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7B is a flowchart showing a moving image processing routine according to the first embodiment;

FIGS. 8A to 8C are views for explaining the arrangement of RAW data and the memory allocation of still image RAW data according to the first embodiment;

FIG. 10 is a flowchart showing a development procedure in still image capturing at the time of moving image recording when performing display control according to the second embodiment;

DESCRIPTION OF THE EMBODIMENTS

Exemplary embodiments of the present invention will be described in detail in accordance with the accompanying drawings.

First Embodiment

Figure 1:
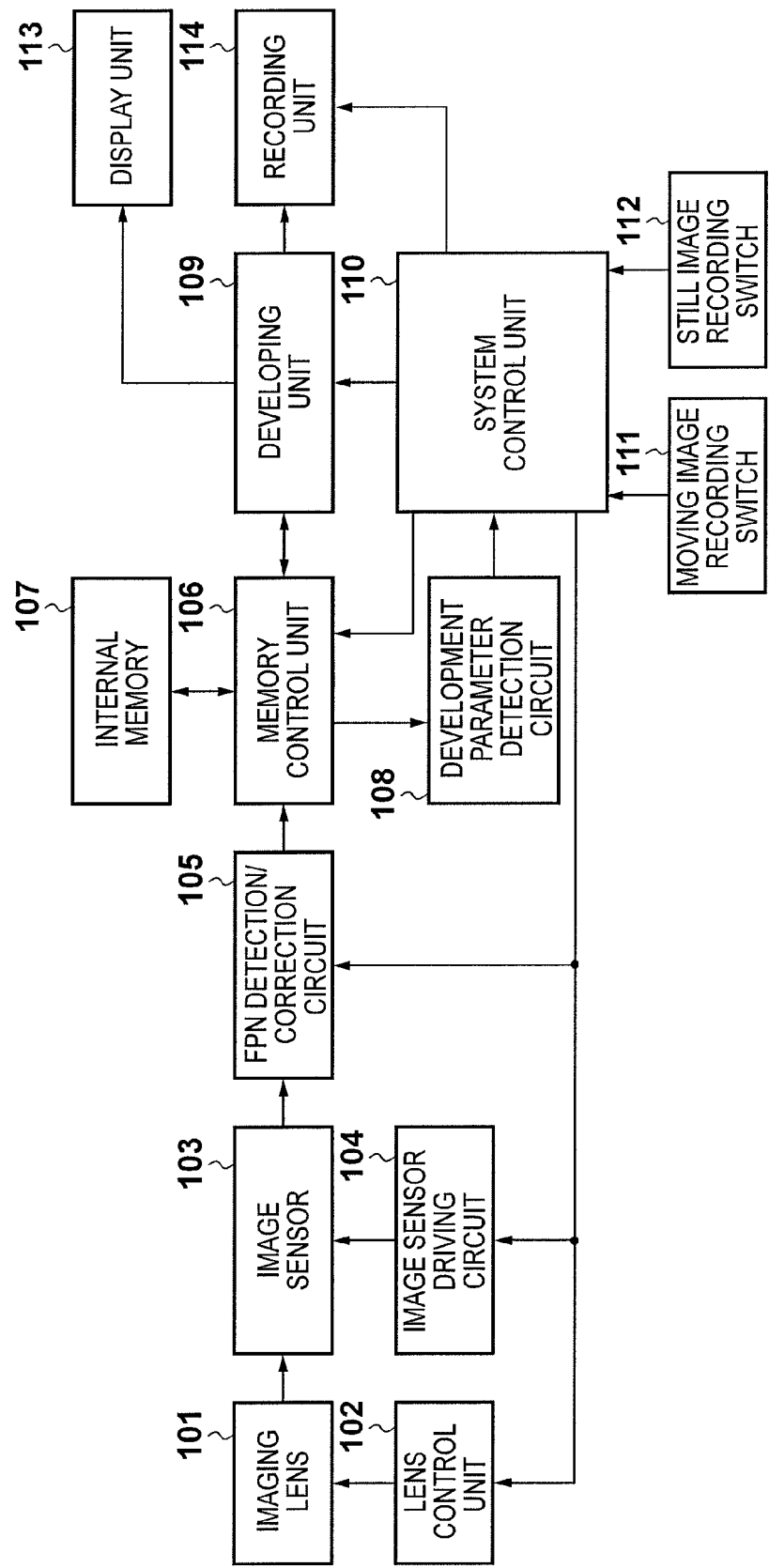
FIG. 1 is a block diagram showing the schematic arrangement of an image capturing apparatus according to an embodiment of the present invention.

FIG. 1 is a block diagram showing the schematic arrangement of an image capturing apparatus according to an embodiment of the present invention. Referring to FIG. 1, an imaging lens 101 includes a plurality of lens groups such as a focus lens and a zoom lens and a stop mechanism. A lens control unit 102 controls the focusing, zooming, and aperture of the imaging lens 101 under the control of a system control unit 110.

An image sensor 103 is a CMOS sensor which generates and outputs charges corresponding to the quantity of incident light by photoelectric conversion. The image sensor 103 can read out charges upon adding specific pixels, thinning out pixels at intervals of specific numbers of rows or columns, or cutting out an area, as well as reading out charges from all the pixels. An image sensor driving circuit 104 drives the image sensor 103 under the control of the system control unit 110. It is possible to thin out pixels or cut out an area, as described above, with respect to the image sensor 103 in accordance with an operation mode for moving images or still images under the control of the image sensor driving circuit 104. In addition, the image sensor driving circuit 104 can change the exposure time, the gain, and the like at the time of image capturing by driving a circuit incorporated in the image sensor 103.

An FPN detection/correction circuit 105 corrects fixed pattern noise (FPN) such as a vertical line defect or column shading included in an output signal (image signal) from the image sensor 103.

A memory control unit 106 can write an output from the FPN detection/correction circuit 105 in an internal memory 107 or transfer it to a developing unit 109 under the control of the system control unit 110. The memory control unit 106 can also read out data from the internal memory 107 and transfer it to the developing unit 109 or a development parameter detection circuit 108. In contrast, the memory control unit 106 can also write a developed signal from the developing unit 109 in the internal memory 107.

The developing unit 109 is an image processing circuit which performs various types of development processes for the RAW data obtained via the memory control unit 106. A development process is image processing for visualizing output RAW data complying with the arrangement of the image sensor. The image data processed by the developing unit 109 is output upon being converted into a signal format suitable for each of the device formats of a display unit 113 and recording unit 114. The display unit 113 is formed from a display device such as an LCD display, and the recording unit 114 is a recording device for recording moving images and still images on a recording medium such as a memory card.

A moving image recording switch 111 and a still image recording switch 112 are connected to the system control unit 110 to input various types of operation instructions. The moving image recording switch 111 is a spring back type press button. Every time the system control unit 110 detects the pressed state of this button, the unit can operate to issue an instruction to start or stop a moving image capturing/recording operation. Likewise, the still image recording switch 112 is a spring back type press button. Upon detecting the pressed state of the button, the system control unit 110 can operate to issue an instruction to perform still image capturing/recording.

Figure 2:
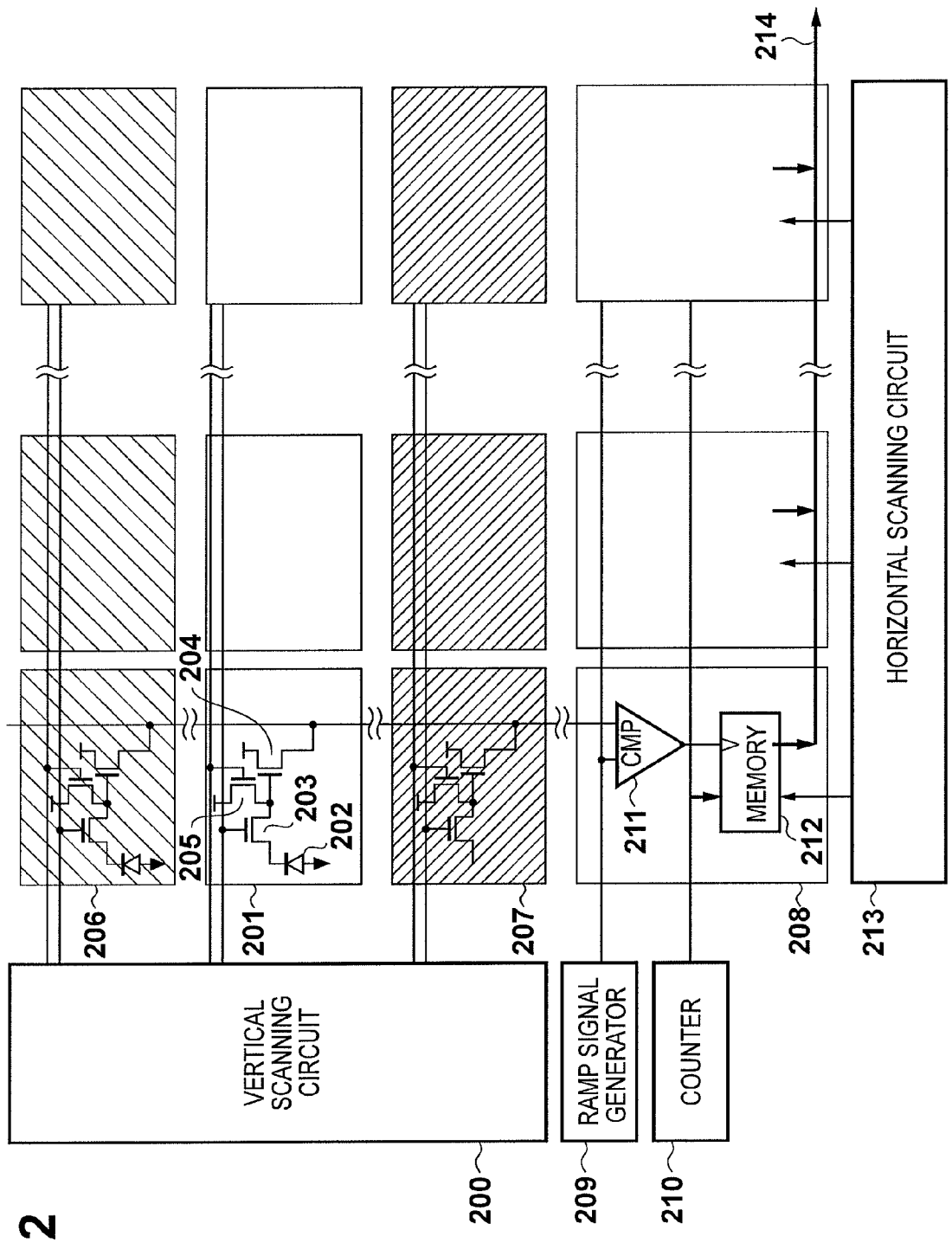
FIG. 2 is a view showing the detailed arrangement of part of an image sensor according to the embodiment.

The arrangement of the image sensor 103 in FIG. 1 will be described next. FIG. 2 is a view showing part of the arrangement of the image sensor 103. Referring to FIG. 2, reference numeral 201 denotes light receiving pixels which receive light from the imaging lens 101. The light receiving pixels 201 photoelectrically convert light incident on the surfaces and output the resultant electrical signals.

The light receiving pixels 201 each are constituted by a photodiode 202, a transfer transistor 203, a signal amplifier 204, and a reset transistor 205. The transfer transistor 203 and the reset transistor 205 operate in accordance with signals from a vertical scanning circuit 200 arranged on the image sensor 103. In this case, the vertical scanning circuit 200 includes a shift register and signal generation circuits which drive the respective pixels, such as the transfer transistors 203. Controlling the transfer transistor 203 and the reset transistor 205 by using generated timing signals can control exposure time by resetting and reading out charges in the photodiode 202.

Reference numeral 206 denotes OB (Optical Black) pixels, whose surfaces are light-shielded by light-shielding films, unlike the light receiving pixels 201. The signals output from the OB pixels 206 are used to, for example, determine a black reference for an image in subsequent image processing.

Reference numeral 207 denotes dummy pixels (or NULL pixels) which do not have any portions for photoelectric conversion, unlike the light receiving pixels and the OB pixels. The signals output from the NULL pixels are used to, for example, detect offset variation components of peripheral circuits for the operation of pixels. Note that the NULL pixels 207 each have an arrangement obtained by omitting the photodiode 202 of each of the light receiving pixels 201.

Predetermined numbers of horizontal rows and predetermined numbers of vertical columns of the light receiving pixels 201, the OB pixels 206, and the NULL pixels 207 are respectively arranged to form a two-dimensional array.

Reference numeral 208 denotes a column A/D conversion unit, which is provided for each column to receive outputs from each of the light receiving pixels 201, the OB pixels 206, and the NULL pixels 207 and A/D-convert the outputs, and is constituted by a comparator 211 and a multi-bit memory 212.

In addition, the image sensor 103 includes a ramp signal generator 209 and a counter 210 common to all the vertical columns. The counter 210 counts the arrival time until the magnitude relationship between outputs from each pixel set and an output from the ramp signal generator 209 is reversed upon comparison by the comparator 211, thereby performing A/D conversion. A memory 212 latches a count value for each column.

Reference numeral 213 denotes a horizontal scanning circuit. The column A/D conversion unit 208 selects and reads out a digital signal for each column in accordance with a signal from the horizontal scanning circuit, thereby obtaining an image sensing output 214 from the image sensor 103.

Figure 3:
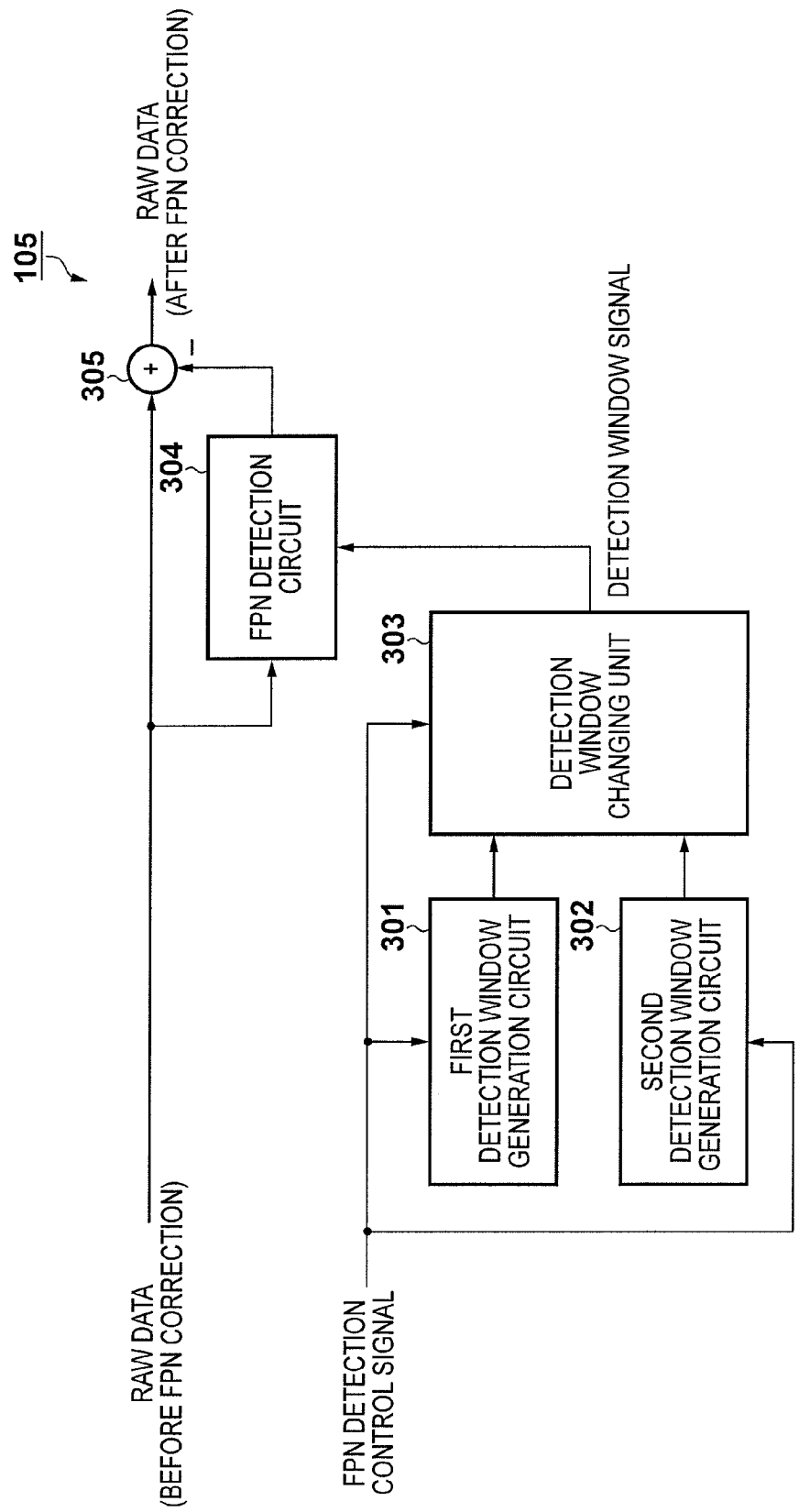
FIG. 3 is a block diagram showing the internal arrangement of an FPN detection/correction circuit according to the embodiment.

The internal arrangement of the FPN detection/correction circuit 105 in FIG. 1 will be described next with reference to FIG. 3. Referring to FIG. 3, a first detection window generation circuit 301 designates a detection area (WV, WH) of NULL pixels, at the time of moving image capturing, to detect, from the NULL pixels, FPN (Fixed Pattern Noise) such as a vertical line defect or column shading included in an output signal from the image sensor 103. Like the first detection window generation circuit 301, a second detection window generation circuit 302 is used for still image capturing during moving image recording and designates a detection area (WV, WH) of NULL pixels.

A detection window changing circuit 303 selects one of outputs from the first detection window generation circuit 301 and the second detection window generation circuit 302 and supplies the selected output to an FPN detection circuit 304.

The FPN detection circuit 304 detects an FPN component in input RAW data from NULL pixels in an active period which are indicated by a detection area from the detection window changing circuit 303. A subtracter 305 cancels the detected FPN component included in an output signal from a light receiving pixel area by subtracting the FPN component from input RAW data.

An example of correction using a signal from the NULL pixels 207 is, for example, a column offset correction operation in which a column AD conversion unit 208 subtracts an offset variation component (column offset variations) superimposed due to, for example, variations in transistor characteristics from the signal value obtained by the light receiving pixels 201.

Figure 4A:
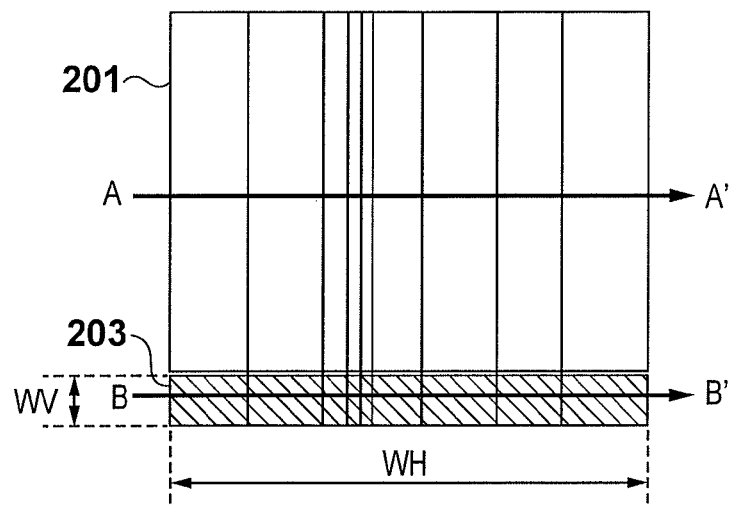
FIGS. 4A to 4C are schematic views showing the correction contents of the FPN detection/correction circuit according to the embodiment.
Figure 4B:
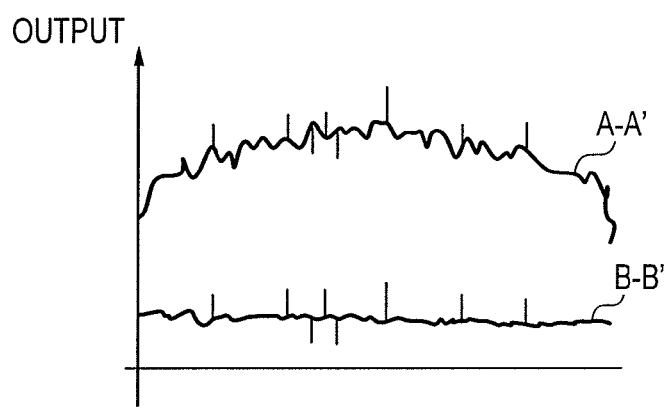
Figure 4C:
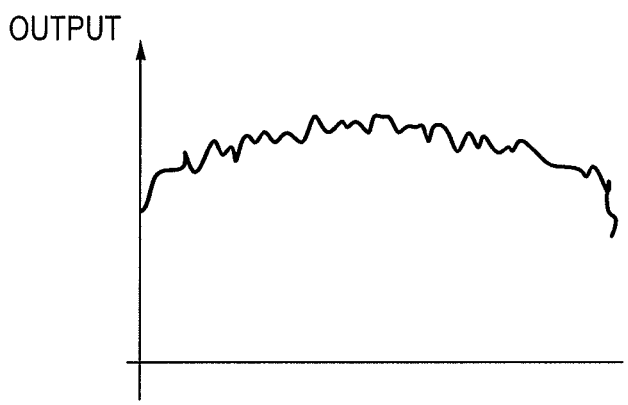

FIG. 4A is a schematic view showing how a vertical line defect has occurred due to column offset variations. FIG. 4B is a graph showing the waveform of an output signal before correction. FIG. 4C is a graph showing the waveform of the output signal after the correction. These graphs show outputs from portions (A-A' and B-B') corresponding to FIG. 4A.

Outputs (A-A') from the light receiving pixels 201 have an output on which column offset variations are superimposed, in addition to a dark current and a signal originating from light entering from the imaging lens 101. In contrast to this, outputs (B-B') from the NULL pixels 207 which do not include any portion to perform photoelectric conversion are robust against the influence of a dark current and enables effective detection of column offset variations. That is, it is possible to obtain an output signal from which column offset variations are removed, by subtracting output signal values from the NULL pixels 207 from output signal values from the light receiving pixels 201 for each column.

In this case, a correction value for column offset variations is calculated by averaging signal values from a plurality of pixels or computation using a recursive filter in order to reduce the influence of random noise and improve correction accuracy.

Figure 5:
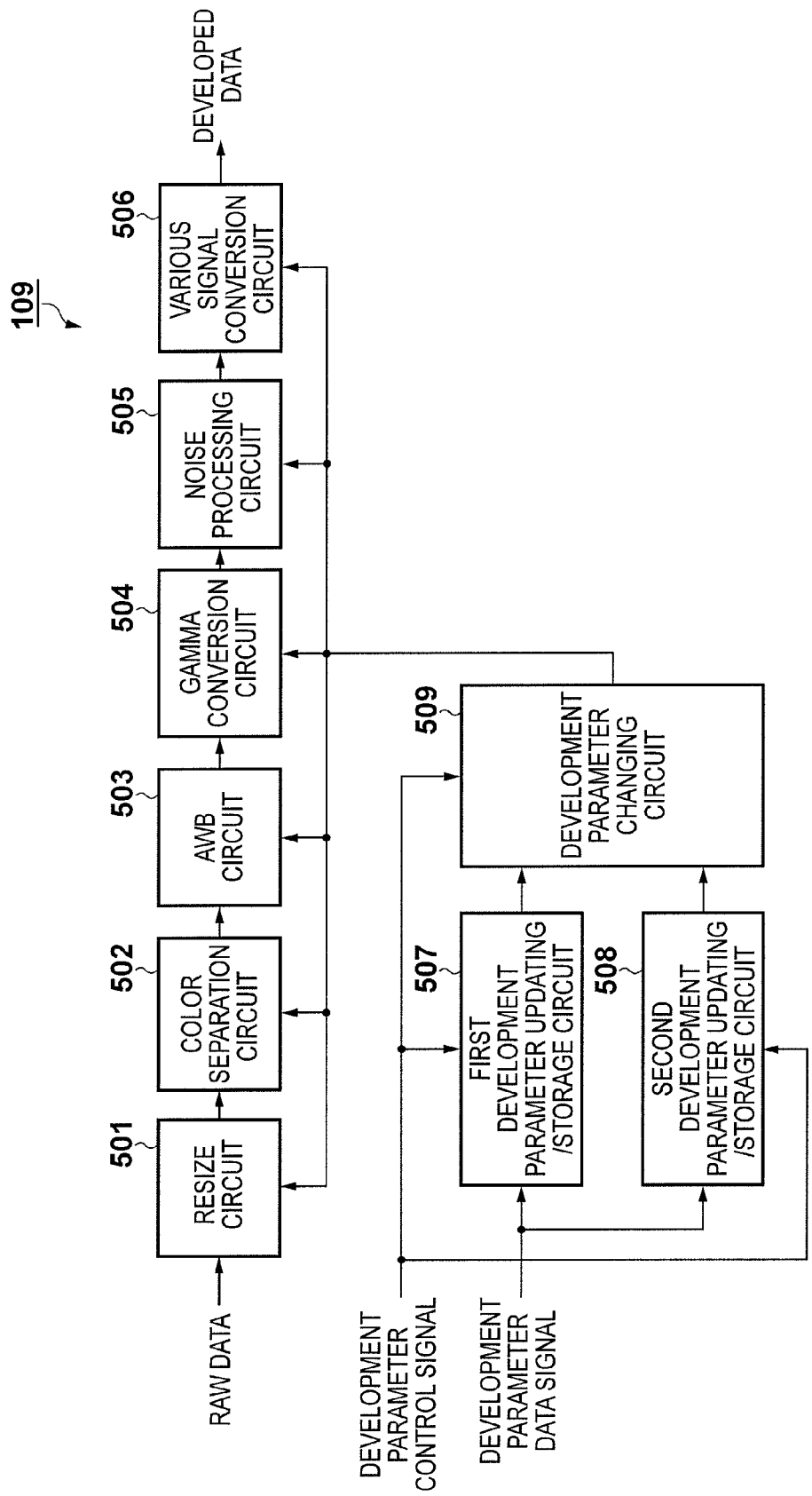
FIG. 5 is a block diagram showing the internal arrangement of a developing unit according to the embodiment.

FIG. 5 shows an example of the internal arrangement of the developing unit 109 in FIG. 1. Referring to FIG. 5, a resize circuit 501 is a circuit to comply with different image sizes at the time of moving image capturing and at the time of still image capturing. The resize circuit 501 cuts out an image at an aspect ratio of 16:9 to reduce it to the standard image size of a moving image at the time of moving image capturing and processes an image at almost 1:1 magnification at the time of still image capturing.

A color separation circuit 502 separates RAW data read out from the image sensor 103 in a Bayer color pattern into R, G, and B signals. An AWB (Auto White Balance) circuit 503 adjusts the white balance of an image by multiplying the R, G, and B signals by detected white balance coefficients.

A gamma conversion circuit 504 is a circuit for maintaining the predetermined dynamic range and tonality of an image signal. A noise processing circuit 505 removes and suppresses random noise included in an image signal. A various signal conversion circuit 506 converts data into a signal format suitable for each of the device formats of the display unit 113 and recording unit 114. For example, the various signal conversion circuit 506 can convert data into a television signal format such as YUV and displays the resultant data on the display unit 113, and perform JPEG compression conversion and conversion to a moving image file format such as an AVI file format with respect to the recording unit 114 to record the resultant data in a recording medium such as a memory card.

In addition, a first development parameter updating/storage circuit 507 updates and stores development parameters for moving images which are used at the time of moving image capturing. On the other hand, a second development parameter updating/storage circuit 508 updates and stores development parameters for still images which are used at the time of still image capturing.

A development parameter changing circuit 509 selects one of outputs from the first development parameter updating/storage circuit 507 and the second development parameter updating/storage circuit 508. The development parameter changing circuit 509 then supplies the selected development parameter output to the above corresponding circuits 501 to 506 described above. For example, development parameters include a resize ratio and a cutout amount for the resize circuit 501, matrix coefficients for color conversion for the color separation circuit 502, and WB coefficients for the AWB circuit 503.

Figure 6:
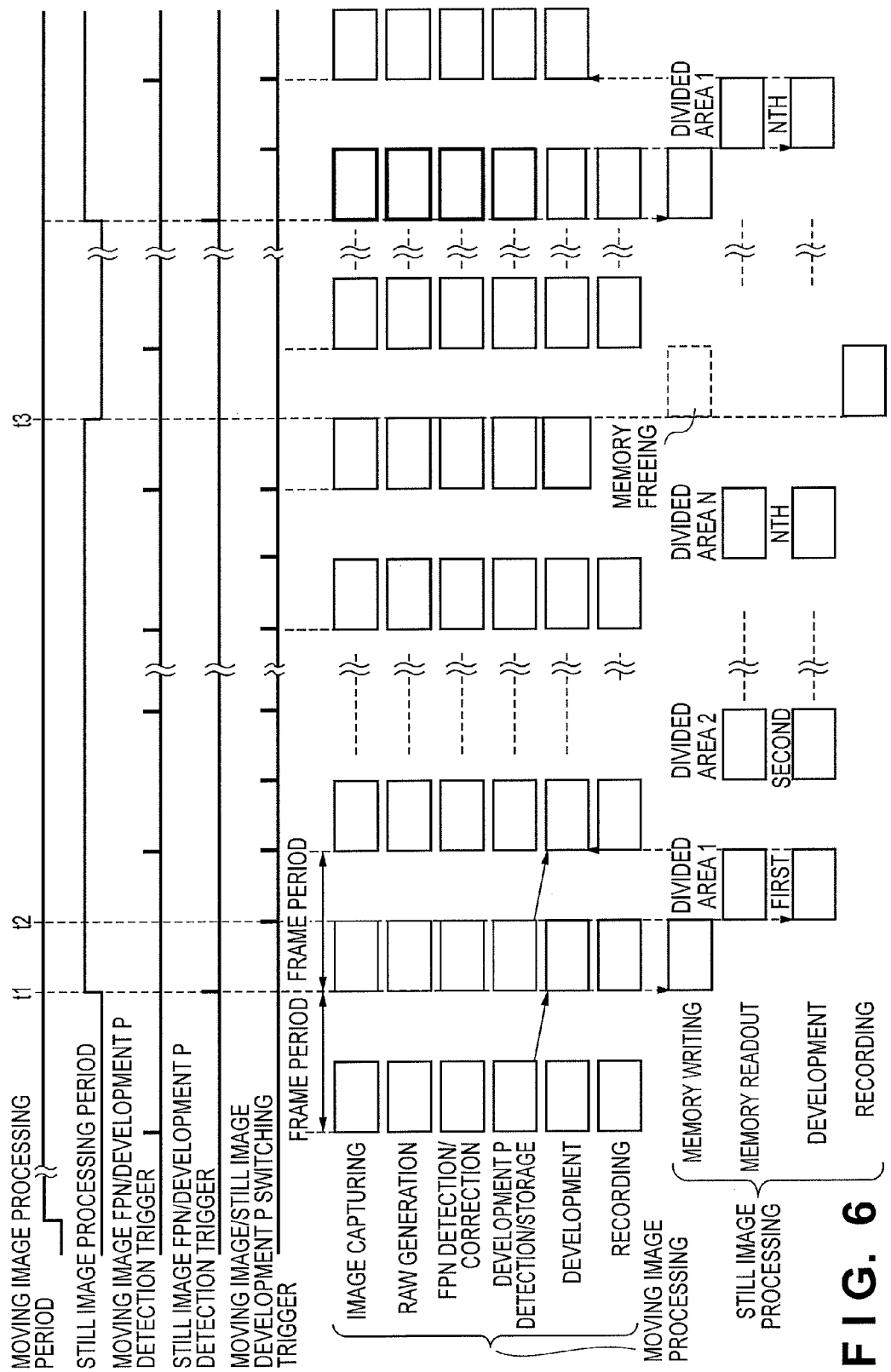
FIG. 6 is a timing chart in a case of performing still image capturing during moving image recording according to the first embodiment.
Figure 7A:
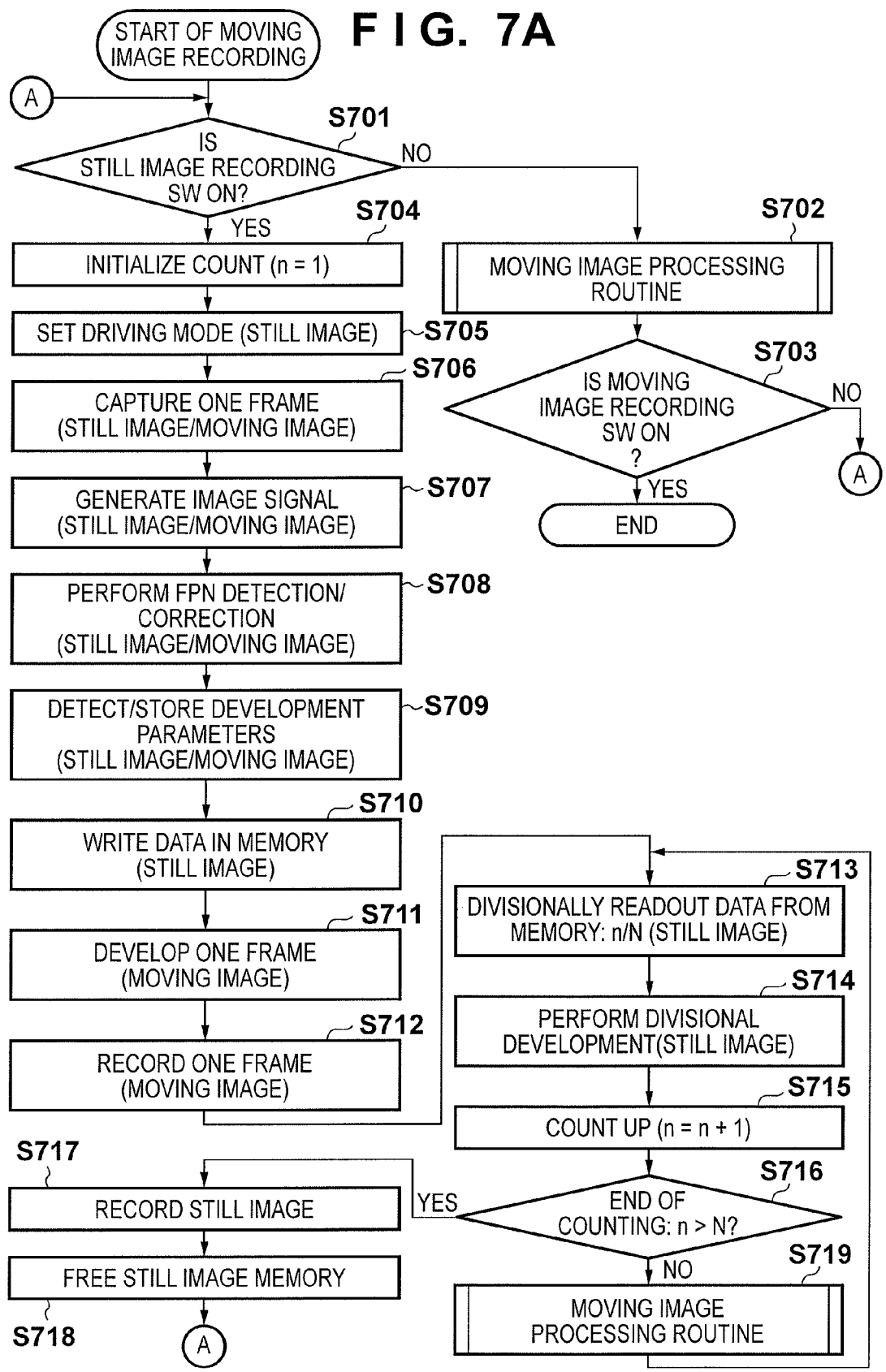
FIG. 7A is a flowchart showing a moving image capturing sequence according to the first embodiment.

An operation of performing still image capturing during moving image recording by using the image capturing apparatus in FIG. 1 will be described in detail next. FIG. 6 is a timing chart schematically showing the timings of processes in the respective unit. FIGS. 7A and 7B are flowcharts in the system control unit 110 for implementing the operations of the respective units at the timings shown in FIG. 6.

Referring to FIG. 6, for the sake of convenience, a process period for a moving image synchronously formed inside the system control unit 110 and a process period for a still image during moving image recording will be referred to as high level periods hereinafter. A trigger timing (rising edge) of detection of FPN and a development parameter at the time of moving image capturing is synchronized with a start timing for each moving image one-frame period.

The trigger timing (rising edge) of detection of FPN and a development parameter in a still image during moving image recording is synchronized with only the start timing of the first moving image one-frame period after a process period for a still image during moving image recording becomes active (high level).

This apparatus generates a moving image/still image development parameter changing trigger timing (rising edge) two times for each frame in moving image capturing within an active (high level) period in still image processing during moving image recording. The first timing is synchronized with the start timing of each moving image one-frame period. The second timing is synchronized with the end timing of development of a moving image. The apparatus performs this operation to time-share the processing circuit of the developing unit 109 for a moving image and a still image in a moving image one-frame period.

More specifically, when the user issues an instruction to capture a still image during moving image recording, the apparatus temporarily writes RAW data (still image) obtained at the start timing (t1) of the next frame period of the moving image in the internal memory 107. The apparatus performs normal moving image development and recording processes for the RAW data obtained at this time. Upon completing the normal moving image development and recoding processes, the apparatus performs a development process for part of the RAW data stored in the memory 107 (t2) by using the remaining time of the frame period. In order to perform moving image development and recording processes and a still image development process in a one-frame period by using the same developing unit 109, this embodiment generates a development parameter changing trigger timing two times for each frame.

In subsequent frame periods, the apparatus sequentially performs development processes for part of the RAW data stored in the internal memory 107 upon performing normal moving image capturing, development, and recording. This makes it possible to finally complete the development processes for one still image and record the resultant image (t3). The apparatus then frees the memory area in the internal memory 107 accompanying still image recording.

Note that although FIG. 6 shows moving image development process times and still image development process times at equal intervals for the sake of descriptive convenience, they do not occur at equal intervals in practice. As the frame rate of a moving image increases, a one-frame period of the moving image decreases, resulting in extremely shortening the development time by a still image. It is known that under general design conditions in a digital camera or the like, when the frame rate of a moving image is, for example, 30 fps, the development time which can be shared by a still image decreases to about 1/16 that of the moving image. This prolongs the total development time required for the still image (15 times that of the moving image). If the image size of the still image is four times that of the moving image, the development time required further increases to 60 times that of the moving image. That is, according to the estimate, this development process takes two sec. In this division phenomenon, a division count N is 64.

A procedure for operations performed at the timings in FIG. 6 will be described in detail below with reference to the flowcharts of FIGS. 7A and 7B. First of all, when the user presses the moving image recording switch 111 to issue an instruction to start moving image recording, the system control unit 110 detects the instruction and starts a moving image recording operation.

In step S701, the system control unit 110 detects whether the user has pressed the still image recording switch 112. If the system control unit 110 does not detect the pressing of the button, the process shifts to the moving image process routine in step S702. The moving image process routine performed in step S702 will be described with reference to FIG. 7B.

In the moving image process routine in step S702, the system control unit 110 sets a driving mode corresponding to the moving image capturing mode for the image sensor driving circuit 104 in step S720. In step S721, the system control unit 110 starts capturing one frame for a moving image. In step S722, the apparatus generates an image signal cut out for a moving image and read out from the image sensor 103.

In step S723, the FPN detection/correction circuit 105 performs an FPN detection/correction process for the image signal generated for a moving image upon switching to the first detection window generation circuit 301 under the control of the system control unit 110.

In step S724, the development parameter detection circuit 108 detects various types of development parameters for a moving image, the apparatus receives the development parameters via the system control unit 110. The received development parameters are transferred to the first development parameter updating/storage circuit 507 in the developing unit 109 to be updated/stored for a development process for the next moving image frame.

In step S725, the system control unit 110 causes the development parameter changing circuit 509 to select moving image development parameters stored by the first development parameter updating/storage circuit 507, and performs a one-frame development process for a moving image.

In step S726, the developing unit 109 outputs the converted recording signal so that a one-frame development signal for a moving image is converted into a moving image file format and the resultant data is ad-on recorded in a moving image file in the memory card of the recording unit 114. In addition, the system control unit 110 performs recording control for the recording unit 114. When starting recording control, the system control unit 110 terminates the routine processing and returns to the main routine without waiting for the end of the recording operation.

Upon returning from the moving image processing routine in step S702, the system control unit 110 detects in step S703 whether the user has pressed the moving image recording switch 111. If the system control unit 110 detects that the user has pressed the button, the control unit terminates the moving image processing. If the system control unit 110 does not detect the pressing of the moving image recording switch 111 in step S703, the process returns to step S701 to detect whether the user has pressed the still image recording switch 112. While the system control unit 110 does not detect the pressing of both the moving image recording switch 111 and the still image recording switch 112, the control unit repeats processing from step S701 to step S703. During this period, the system control unit 110 continues the normal moving image capturing/recording operation without performing any still image capturing in between.

On the other hand, if the system control unit 110 detects in step S701 that the user has pressed the still image recording switch 112, the process advances to step S704 to shift to a still image capturing process during moving image recording. In step S704, the system control unit 110 initializes a counter variable n (n=1) for counting up at the timing for each frame of a moving image.

In step S705, the system control unit 110 sets a driving mode corresponding to the still image capturing mode for the image sensor driving circuit 104. In step S706, the system control unit 110 starts capturing one frame of a still image. In step S707, the system control unit 110 generates an image signal read out from the image sensor 103 with a size that can be shared by both a still image and a moving image.

FIG. 8A is a conceptual view showing an example of the relationship between a still image and a moving image on the pixel array of the image sensor 103. In this example, a moving image 802 having an aspect ratio of 16:9 is included in a still image 801 having an aspect ratio of 4:3, with their widths being matched with each other. That is, an image signal generated with a size that can be shared by both a still image and a moving image is set to have a size equivalent to that of an image signal for a still image.

In step S708, the FPN detection/correction circuit 105 performs FPN detection/correction for the RAW signal generated with a size that can be shared by both a still image and a moving image in step S708 upon switching to the second detection window generation circuit 302 under the control of the system control unit 110. In step S709, the development parameter detection circuit 108 detects various types of development parameters respectively suitable for a still image and a moving image.

The still image development parameters and moving image development parameters received via the system control unit 110 are transferred to the first development parameter updating/storage circuit 507 and the second development parameter updating/storage circuit 508 in the developing unit 109, respectively. The transferred still image development parameters are updated and stored for a still image divisional development process in the current moving image frame. The moving image development parameters are updated and stored for a moving image one-frame development process in the next moving image frame.

In step S710, the system control unit 110 writes the still image RAW data in the internal memory 107 via the memory control unit 106. In step S711, the system control unit 110 causes the development parameter changing circuit 509 to select the development parameters stored in the first development parameter updating/storage circuit 507. The system control unit 110 then performs a moving image one-frame development process for the moving image RAW data cut out from the still image RAW data by the resize circuit 501.

In step S712, the developing unit 109 then outputs the converted recording signal so as to perform ad-on recording of the moving image one-frame developed image in a moving image file in the memory card of the recording unit 114 upon conversion to a moving image file format. The system control unit 110 then performs recording control for the recording unit 114. When the system control unit 110 starts recording control, the process shifts to step S713.

The still image RAW data written in the internal memory 107 is divided into N areas in the internal memory, and a readout sequence from 1 to N is set for the respective divided areas. Note that a divided area size is set to complete a development process for the amount of RAW data included in each divided area in the remaining time of a one-frame period after a moving image development process. FIG. 8B shows the relationship among divided areas 1 to N of the still image RAW data on the pixel array of the image sensor 103. FIG. 8C shows a conceptual rendering of the memory allocation of divided areas 1 to N of still image RAW data in the internal memory 107.

In step S713, the system control unit 110 reads out the nth RAW data of those divided into N areas from the still image RAW data written in the internal memory 107 via the memory control unit 106, and supplies the readout data to the developing unit 109.

In step S714, the system control unit 110 causes the development parameter changing circuit 509 to select the development parameters stored in the second development parameter updating/storage circuit 508, and a development process is performed for the nth divided RAW data for a still image. The system control unit 110 then writes each generated developed image in the still image development area in the internal memory through the memory control unit 106 so as not to overlap each other.

In step S715, the system control unit 110 increments the count value of the counter variable n by one. In step S716, the system control unit 110 determines whether the count value of the counter variable n exceeds a predetermined area division count N. If NO in step S716, the process shifts to step S713 again through the moving image processing routine in step S719. Note that the processing contents of the moving image processing routine performed in step S719 are the same as those of the moving image processing routine performed in step S702 described with reference to FIG. 7B. The system control unit 110 repeats the series of a still image development process in steps S713 to S715 for the divided RAW data increased in rank by one up to the rank N.

If the system control unit 110 determines in step S716 that the count value of the counter variable n exceeds the area division count N, the process exits from the loop and shifts to step S717. In step S717, the system control unit 110 concatenates the developed images of all the divided areas from the still image development area in the internal memory 107 via the memory control unit 106 into a developed image of the still image in all the areas, and reads out the resultant data to the developing unit 109.

The system control unit 110 then converts the data, and the developing unit 109 outputs the converted recording signal so that the recording signal is converted into the still image file format and recorded on the still image file in the memory card of the recording unit 114. In addition, the system control unit 110 performs recording control for the recording unit 114.

When the system control unit 110 starts recording control, the process shifts to step S718 without waiting for the end of recording to free the still image RAW data area in the internal memory 107 for the next still image capturing. Upon completing a still image capturing process during moving image recording, the process shifts to first step S701 to accept the next still image capturing.

As described above, according to the first embodiment, it is possible to perform high resolution still image capturing without stopping moving image recording and without any constraints from the number of frames to be captured, by dividing the read still image and performing a development process for each divided area during moving image capturing.

Second Embodiment

The second embodiment of the present invention will be described next. The first embodiment has simply described that the developing unit 109 can convert a developed image into a signal in a format suitable for the display device of the display unit 113 to enable image display. The second embodiment will describe, with a specific example, the operation of a display unit in the case of performing still image capturing during moving image recording.

Figure 9:
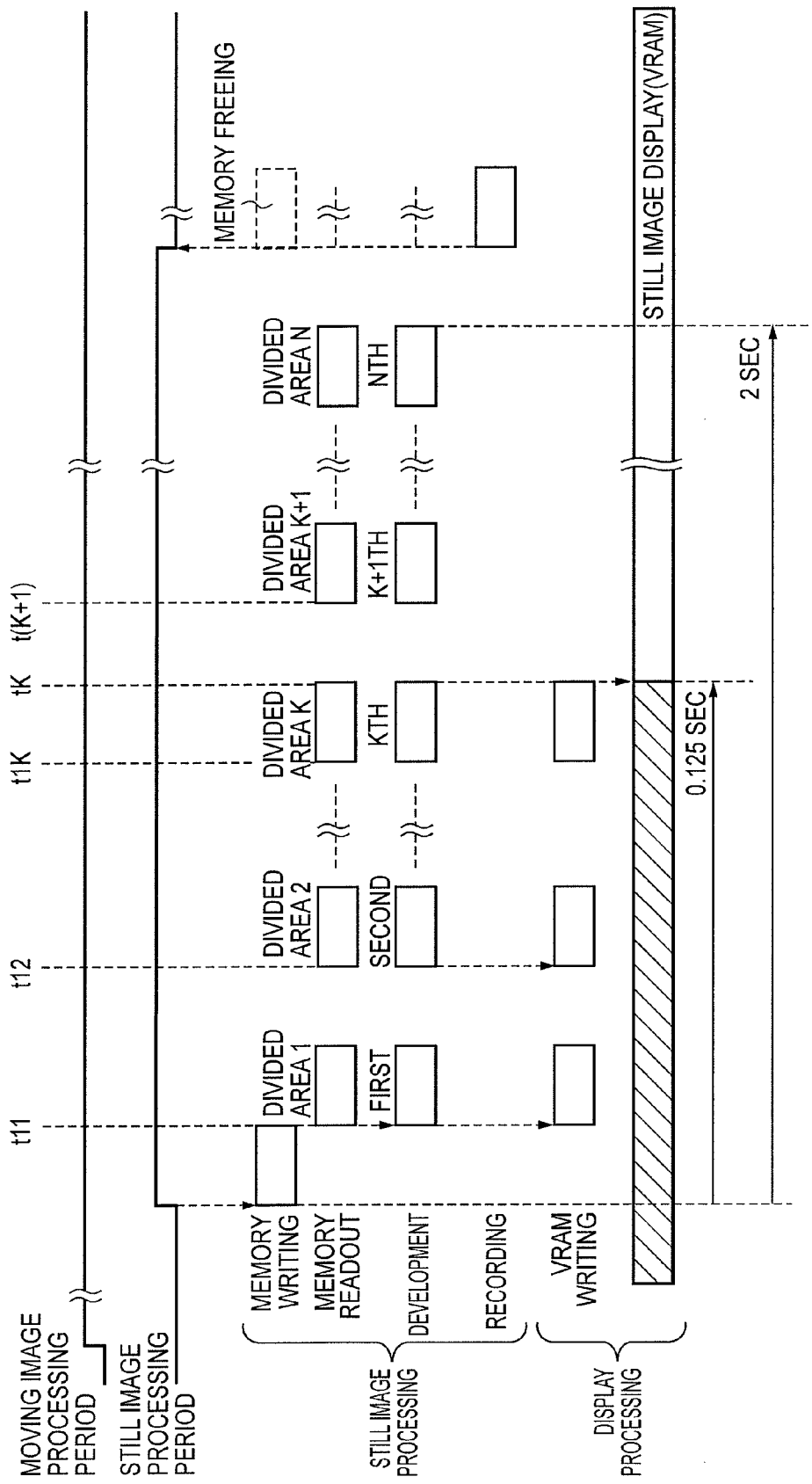
FIG. 9 is a timing chart in still image capturing at the time of moving image recording when performing display control according to the second embodiment.

FIG. 9 is a timing chart when performing still image capturing during moving image recording in the second embodiment. Note that the timing of moving image processing in the second embodiment is the same as that in the timing chart shown in FIG. 6, and hence a description of it will be omitted. FIG. 9 shows only the timing of still image processing different from that in the first embodiment and the timing of a newly added display process. In the second embodiment, as shown in FIG. 9, upon completing the Kth development process, the apparatus starts displaying an obtained still image.

FIG. 10 is a flowchart showing processing in a system control unit 110 to implement a display operation at the timing shown in FIG. 9. The second embodiment is the same as the first embodiment except that a display process is added to the process in step S713 in FIG. 7A, and hence a description of other processes will be omitted, and the process added to the second embodiment will be described.

In addition, the second embodiment is configured to display a still image even during development by devising the division method for divisional development in the first embodiment in order to quickly display a captured still image when performing still image capturing during moving image recording. In addition, for this purpose, the second embodiment is configured to provide a VRAM (not shown) capable of storing LCD display data for a developing unit 109 and sequentially expand divisionally developed images in the VRAM.

Figure 11A:
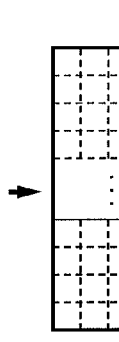
FIGS. 11A to 11C are views for explaining the arrangement of RAW data according to the second embodiment of the present invention.
Figure 11A:
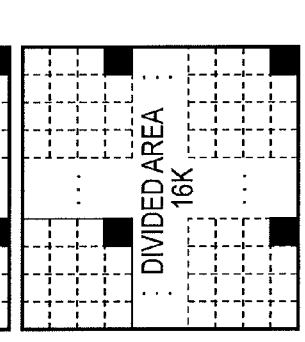
Figure 11B:
Figure 11B:
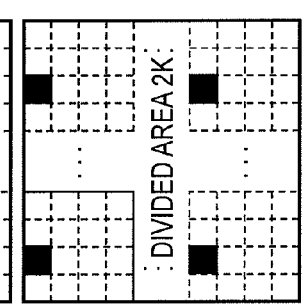
Figure 11C:
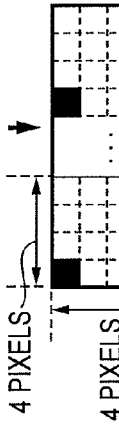
Figure 11C:
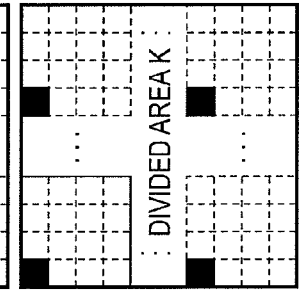
Figure 12:
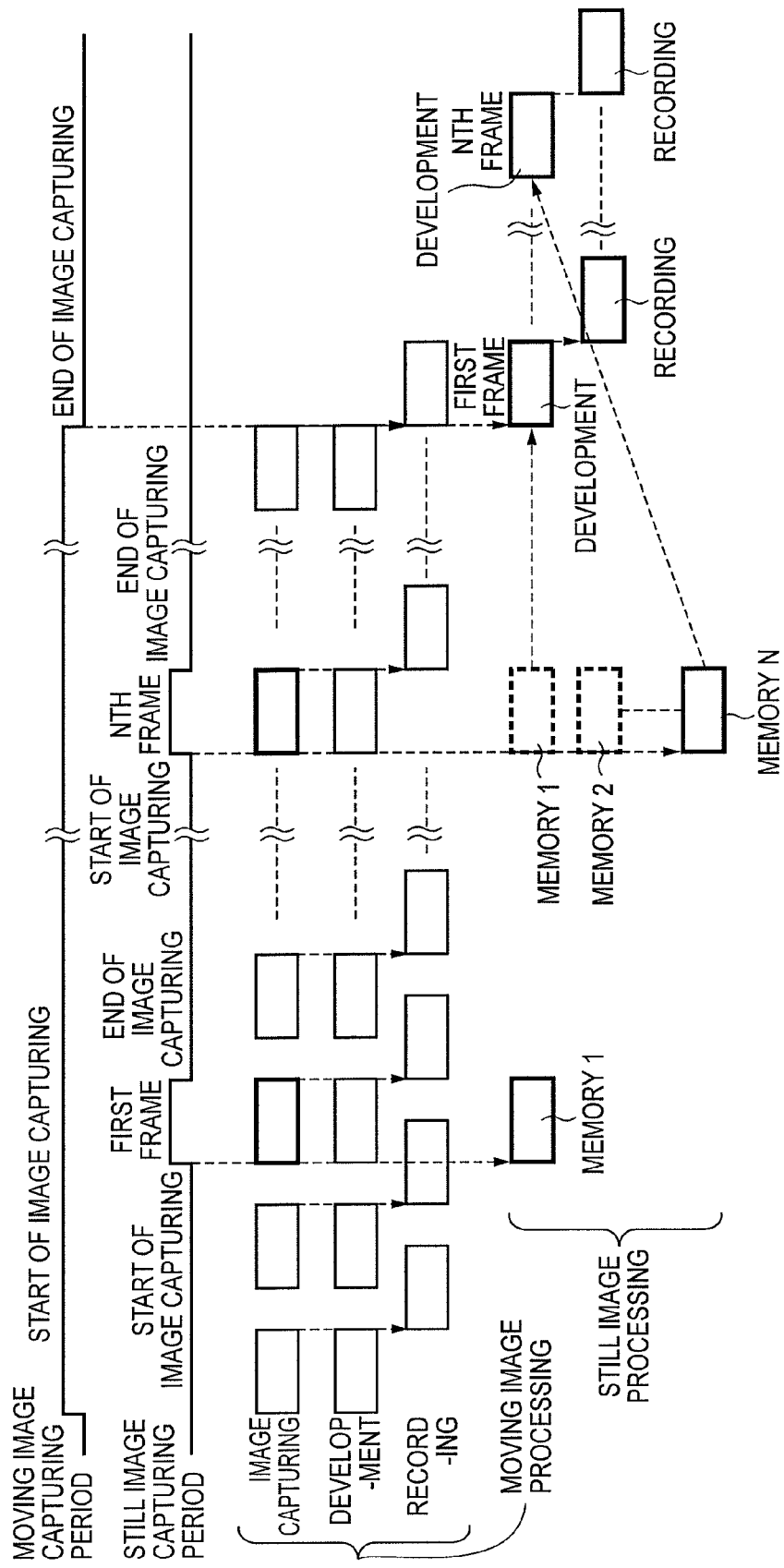
FIG. 12 is a timing chart in a case of performing conventional still image capturing during moving image recording.

FIGS. 11A to 11C are conceptual views showing the relationship among divided areas 1 to N of still image RAW data on the pixel array of an image sensor 103. In the second embodiment, the divided areas are arranged in different ways relative to the divided areas shown in FIG. 8B. In the second embodiment, first of all, the still image RAW data stored in an internal memory 107 is roughly divided by a division count K. Note that the division count K will be described later. Each divided area is further divided into divided blocks each including, as the minimum unit, vertical 4 pixels×horizontal 4 pixels=16 pixels. The apparatus reads out one pixel as a representative pixel from each divided block in each divided area. When the apparatus reads out and develops pixel data in this manner, the number of pixels developed when the apparatus circulates the divided areas 1 to K once becomes 1/16 of the total number of pixels.

FIG. 11A shows an example of a divisional readout operation performed upon selection of one pixel at the upper leftmost position as a specific position among the 16 pixels in each of the finely divided blocks. The apparatus develops still image RAW data in the remaining time of a one-frame period after the end of a moving image development process. If, therefore, the developing unit 109 has the same throughput as that in the first embodiment, it suffices that the division count K in the second embodiment is 1/16 of the division count N in the first embodiment. In other words, one pixel at the upper leftmost position of each divided block of each of divided areas 1 to 16 in the first embodiment corresponds to divided area 1 in the second embodiment. In addition, one pixel at the upper leftmost position of each divided block of each of divided areas 17 to 32 in the first embodiment corresponds to divided area 2 in the second embodiment. Likewise, first divided areas 1 to K are set as a readout pattern.

FIG. 11B shows a case in which the apparatus selects a pixel on the right side of the pixel selected in the case of FIG. 11A among the 16 pixels in each divided block. In this case, in a readout pattern, divided areas are allocated as next divided areas K+1 to 2K. For example, even in the case of an area corresponding to divided areas 1 to 16 in the first embodiment like divided area 1 in the second embodiment, when reading out pixels, starting from a pixel on the right side of the upper leftmost pixel of each divided block, the area is allocated as divided area K+1 in the second embodiment.

Likewise, FIG. 11C shows a case in which the apparatus selects the lower rightmost pixel among the 16 pixels of each divided block. In this readout pattern, divided areas are allocated as final divided areas 15K+1 to 16K. For example, even in the case of an area corresponding to divided areas 1 to 16 in the first embodiment like divided area 1 in the second embodiment, when reading out pixels, starting from the lower rightmost pixel of each divided block, the area corresponds to divided area 15K+1 in the second embodiment. As described above, since there are 16 readout variations with respect to the division count K, the total division count of areas is 16K, that is, N.

Note that when considering the display performance of a general LCD used for a digital camera or the like, a sensor having a pixel count as much as the VGA pixel count (about 300,000 pixels) is sufficiently practical. Therefore, a sensor having a pixel count of 10,000,000 or more does not have much problem in terms of pixel density.

According to the design example shown in the first embodiment, the frame rate of a moving image is 30 fps, the division count N of a still image is 64, and the total development time of all the areas is 2 sec. When this is applied to the division method shown in FIGS. 11A to 11C, the division count K is 4, which enables to uniformly read out pixels on the entire area, and the required time is 1/16 of the total time of 2 sec, that is, 0.125 sec.

The timing operation in FIG. 9 will be described in detail below with reference to the flowchart of FIG. 10. In a processing routine for still image divisional development (step S713), first of all, the apparatus develops divided area 1 of a still image in accordance with a sequence based on the division method described above with reference to FIGS. 11A to 11C in step S901.

In step S902, the apparatus determines whether the count value of a counter variable n is less than a predetermined area count K. If YES in step S902, a various signal conversion circuit 506 resizes the developed image of each divided area into an image having a predetermined size and writes it in a VRAM (t11, t12, . . . ) in step S903. The process then returns from the processing routine for divisional development of the still image without having any involvement of a display operation.

On the other hand, if the apparatus determines in step S902 that the count value of the counter variable n is equal to or more than the predetermined division count K (t1K), the process advances to step S904. If the apparatus determines in step S904 that the count value of the counter variable n is equal to the predetermined division count K, the various signal conversion circuit 506 resizes the developed image of a divided area into an image having a predetermined size and writes it in a VRAM (t1K) in step S905. In step S906, the contents of the developed images of the divided areas 1 to K written in the VRAM so far are output to a display unit 113 to display a still image (tK). The process then returns from the processing routine for the divisional development of the still image.

In addition, if the apparatus determines in step S904 that the count value of the counter variable n exceeds the predetermined area division count K, the process returns from the processing routine for the divisional development of the still image without having any involvement of a display operation (t(K+1)).

As described above, in addition to the same effects as those of the first embodiment, the second embodiment has the effect of being capable of displaying a still image at a timing earlier than a development process of the entire still image.

Note that in the case described with reference to FIGS. 11A to 11C, each divided block is constituted by 4×4=16 pixels, and the apparatus reads out one pixel from each divided block. However, the present invention is not limited to this. The number of pixels constituting each divided block may be larger than 16. In addition, the apparatus may perform control to read out a plurality of pixels at a time as long as they are the pixels constituting each divided block. For example, if the image sensor 103 is covered by color filters in a Bayer pattern, each divided block may be constituted by 8×8=64 pixels, and 4 pixels may be read out at a time. Note that if a plurality of pixels are to be read out from each divided block, the apparatus may be configured to read out pixels in units suitable for a development process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-082497, filed on Apr. 10, 2013, which is hereby incorporated by reference herein in its entirety.

What is claimed is:

1. An image capturing apparatus which is configured to perform moving image recording and still image capturing comprising:
   an image sensor configured to output an image signal in accordance with a quantity of incident light;
   a developing circuit configured to perform development processes for a moving image and a still image for image signals;
   a memory configured to store image signals output from said image sensing unit; and
   a control circuit configured to control to perform a first development process for one frame of the image signals output from said image sensor to generate moving image data and a second development process for part of one frame of the image signals stored in said memory to generate still image data,
   wherein the control circuit controls to perform the first development process and the second development process within a one-frame period of a moving image capturing and perform the second development process between the first development processes for two frames of the image signals output from said image sensor performed in two-frame periods.

2. The apparatus according to claim 1, wherein said control circuit controls to sequentially perform the second development process for one frame of the image signal stored in said memory by each of a plurality of divided areas of a still image, and records the one frame of the developed image signal for the still image data to a storage medium after developing one frame of the image signal is finished.

3. The apparatus according to claim 2, wherein when the developing circuit performs the second development process for each divided area, said control circuit controls to perform the second development process upon reading out all image signals included in the divided area.

4. The apparatus according to claim 2 further comprising a display,
   wherein said control circuit, when the developing circuit performs the second development process for each divided area, controls to read out a predetermined number of image signal/signals from each of a plurality of blocks obtained by dividing each divided area, and to read out different image signal/signals by circulating the divided areas so as to perform the second development process for all image signals in each of the blocks, and
   said display displays the developed image signals upon completion of the circulating of the plurality of divided areas once.

5. The apparatus according to claim 1 further comprising:
   a development parameter memory configured to store moving image development parameters used in the first development process and still image development parameters used in the second development process; and
   a development parameter switch configured to switch between the moving image development parameters and the still image development parameters to provide either of the moving image development parameters and the still image development parameters when still image capturing is performed during moving image recording.

6. The apparatus according to claim 5, wherein the development parameters include coefficients for a resize process, a white balance process, a gamma conversion process, and a noise suppression process.

7. The apparatus according to claim 1 further comprising a correction unit configured to detect and correct fixed pattern noise included in an image signal output from said image sensing unit,
   wherein said correction unit corrects both a moving image and a still image.

8. The apparatus according to claim 7, wherein said correction unit detects and corrects fixed pattern noise every time the image signal is output from said image sensing unit regardless of a moving image or a still image.

9. A method of controlling an image capturing apparatus which is configured to perform moving image recording and still image capturing by using an image sensing unit configured to output an image signal in accordance with a quantity of incident light, the method comprising:
   a storage step of causing a storage unit to store image signals output from the image sensing unit;
   a first developing step of performing a development process for one frame of the image signal output from the image sensing unit to generate moving image data; and
   a second developing step of performing a development process for part of one frame of the image signals stored in the storage unit to generate still image data;
   wherein the first developing step and the second developing step are controlled to be performed within a one-frame period of a moving image capturing and the second developing step is controlled to be performed between the first developing steps for two frames of the image signals output from said image sensing unit performed in two-frame periods.

10. The method according to claim 9, wherein in the second developing step, the development process is sequentially performed for the image signal stored in the storage unit by each of a plurality of divided areas of a still image.

11. The method according to claim 10, wherein in the second developing step, when the development process is performed for each divided area, the development process is performed upon reading out all image signals included in the divided area.

12. The method according to claim 10, wherein in the second developing step, when the development process is performed for each divided area, a predetermined number of image signal/signals are read out from each of a plurality of blocks obtained by dividing each divided area, and different image signal/signals are read out by circulating the divided areas so as to perform the development process for all image signals in each of the blocks, and the method further comprises a display step of displaying, on a display unit, the developed image signals upon completion of the circulating of the plurality of divided areas once.

13. The apparatus according to claim 1, wherein the control circuit controls to perform the first development process and the second development process within a one-frame period of a moving image capturing, in a case where the still image capturing is performed during moving image recording.

14. The method according to claim 9, wherein the first developing step and the second developing step are controlled to be performed within a one-frame period of a moving image capturing, in a case where the still image capturing is performed during moving image recording.

* * * * *